US010618235B2

(12) United States Patent
Valmassoi

(10) Patent No.: US 10,618,235 B2
(45) Date of Patent: Apr. 14, 2020

(54) METHOD OF MANUFACTURING EYEGLASS FRAMES, APPARATUS FOR CARRYING OUT THE METHOD AND FRAMES OBTAINED WITH SUCH METHOD

(71) Applicant: Thema Optical S.r.l., Domegge di Cadore (IT)

(72) Inventor: Roberto Valmassoi, Domegge di Cadore (IT)

(73) Assignee: Thema Optical S.r.l. (IT)

( * ) Notice: Subject to any disclaimer, the term of this patent is extended or adjusted under 35 U.S.C. 154(b) by 27 days.

(21) Appl. No.: 15/312,993

(22) PCT Filed: May 21, 2015

(86) PCT No.: PCT/US2015/031920
§ 371 (c)(1),
(2) Date: Nov. 21, 2016

(87) PCT Pub. No.: WO2015/179610
PCT Pub. Date: Nov. 26, 2015

(65) Prior Publication Data
US 2017/0165933 A1     Jun. 15, 2017

(30) Foreign Application Priority Data

May 21, 2014   (EP) .................................... 14425060

(51) Int. Cl.
*B29D 12/02*     (2006.01)
*B29D 12/00*     (2006.01)
(Continued)

(52) U.S. Cl.
CPC ................ *B29D 12/02* (2013.01); *B23C 3/00* (2013.01); *B26D 7/018* (2013.01); *B26F 1/14* (2013.01);
(Continued)

(58) Field of Classification Search
CPC .......... B29D 12/02; G02C 5/008; B23C 3/00; B23C 2226/61; B23C 2215/40; B26F 1/14; B26F 2001/4436; B26D 7/018
See application file for complete search history.

(56) References Cited

U.S. PATENT DOCUMENTS

| 4,443,074 A | 4/1984 | Giacomelli |
| 4,592,629 A * | 6/1986 | Giacomelli ........... B29C 43/021 |
| | | 351/137 |

(Continued)

FOREIGN PATENT DOCUMENTS

| DE | 9104209 U1 | 7/1991 |
| DE | 102011109939 A1 | 2/2013 |

(Continued)

*Primary Examiner* — Rick K Chang
(74) *Attorney, Agent, or Firm* — Alan G. Towner; Leech Tishman Fuscaldo & Lampl

(57) ABSTRACT

The invention relates to a method for manufacturing parts of acetate eyeglass frames from an acetate plate. The plate is designed with length and height dimensions defining a surface area that encompasses the perimeter boundary of the body of the frame part to be manufactured, and with a thickness the value of which is at least equal to the maximum transverse dimensions of the three-dimensional shape of the body of the frame part itself and extends evenly over the entire surface defined by the length and the height of the plate. The method also comprises the step of forming a cut within the surface dimensions of the plate along the perimeter boundary of the body of the eyeglass part to be manufactured, excepting a pair of portions of said boundary, thereby leaving said portions connected to the plate, and the step of forming the three-dimensional shape of the frame part body by removing material from the thickness of the plate. The same method also comprises the step of forming the lens seats, the grooves for receiving lenses within their seats, a nose bridge, bridge arms, and the endpieces for (Continued)

connection to the temples. The invention further relates to an apparatus for carrying out the process and an eyeglass frame so manufactured.

4 Claims, 8 Drawing Sheets

(51) Int. Cl.
*B26D 7/01* (2006.01)
*B26F 1/14* (2006.01)
*B23C 3/00* (2006.01)
*G02C 5/00* (2006.01)
*B26F 1/44* (2006.01)

(52) U.S. Cl.
CPC .............. *B29D 12/00* (2013.01); *G02C 5/008* (2013.01); *B23C 2215/40* (2013.01); *B23C 2226/61* (2013.01); *B26F 2001/4436* (2013.01)

(56) References Cited

U.S. PATENT DOCUMENTS

| 5,331,355 A | 7/1994 | Frank et al. |
| 2007/0196192 A1 | 8/2007 | Stein |

FOREIGN PATENT DOCUMENTS

| EP | 2322343 A1 | 5/2011 |
| FR | 2754757 A1 | 4/1998 |
| GB | 2293994 A | 4/1996 |
| WO | 2009100863 A2 | 8/2009 |
| WO | 2013149891 A1 | 10/2013 |

\* cited by examiner

METHOD OF MANUFACTURING EYEGLASS FRAMES, APPARATUS FOR CARRYING OUT THE METHOD AND FRAMES OBTAINED WITH SUCH METHOD

The present invention relates to a method of manufacturing parts of eyeglass frames, particularly made of synthetic acetate material.

As used herein, the term eyeglass frames is mainly intended to designate the front of the frame and the side temples that allow its use by being connected to the sides of the front by means of hinges.

The invention also relates to an apparatus for carrying out the method and the frames obtained thereby.

Acetate frames are made in the prior art by processes that still include many manual steps, starting from the provision of an acetate plate having such a size as to allow at least the eyeglass front to be formed therefrom, with a thickness generally ranging from 6 to 8 mm.

The plate is formed from acetate sheets received from a manufacturer. These sheets undergo preliminary heating for about 24 hours in an oven at a temperature of about 50° C. for release of the residual acetone that was used for die cutting the plate to a thickness of 4.6 or 8 mm, such that the material remains stabilized throughout the next processing steps.

In prior art technology, the above mentioned acetate plates undergo a first drilling step to obtain the lens seats.

In most cases this processing step is carried out using fast and accurate numerical-control machines. The frame making process comprises further steps, including the formation of the bridge, that rest on the nose, and the formation of the endpieces for placement of hinges and connection of the temples. According to the prior art, the part that rests on the nose is configured by application of specially fashioned nose pads, also made of acetate, which are joined to the frame front by solvent bonding or using ultrasounds.

A similar procedure is carried out to form the temple connecting endpieces at the sides of the frame, which are conveniently heated for connection to the metal hinges of the temples, such that they may soften and receive one of the metal ends of the hinge.

Further steps for manufacturing an acetate frame include beating of the nose bridge portion to impart the traditional saddle shape thereto, milling of the outer contour of the frame to the rough final shape and finally tumbling in large rotating drums, known as tumblers, which contain wood pieces of various types with abrasive pastes, for grinding and polishing the frame surfaces, and impart its typical sheen and brightness.

At the end of the above described steps, the front of the frame, that results from a flat plate and is itself flat, must be curved to assume its final configuration. For this purpose, it is heated in a special oven and later mechanically bent with the help of a special machine, i.e. a bending press.

Concerning the temples, which are obviously part of an eyeglass frame, they are cut out from an acetate plate having a thickness of about 4 mm, and are heated to longitudinally receive therein a long metal needle, which is designed to form the core of the temple and allow the end opposite to the hinge end to be curved and retain its shape.

The temples also undergo the final surface milling and tumbling steps, like the front body of the frame.

Skilled labor is required for manufacturing acetate frames, which involves the drawbacks of high costs and long production times, reflecting on the overall cost of each frame, and affecting product uniformity.

The frames manufactured with the conventional method, which involves material heating steps, have the drawback of not retaining the shape obtained through these steps because the material tends to be restored to the initial flat-base state, resulting in deformations of the bent and aligned parts that were formed during the processing cycle.

The object of the present invention is to obviate the above drawbacks by providing a method of manufacturing parts of acetate frames that can be further automated to considerably reduce the fabrication costs of the frames.

A further object of the invention is to afford computer control of the various operating steps of the method, such that the frames obtained thereby may be also customized according to the characteristics of the user for which the frame is designed, which characteristics may be directly detected on the user and employed to the control the operating steps of the method.

These and other objects, as better explained hereafter, are fulfilled by a manufacturing method as defined in the accompanying claim 1.

The invention will be described in greater detail with reference to the annexed drawings, which are given by way of illustration and without limitation, in which.

Referring to the above figures, numeral 1 designates the acetate plate from which the eyeglass frame has to be formed according to the process of the present invention. The plate has a rectangular shape, with a longitudinal dimension or length L, a transverse dimension or height H and a thickness S.

Figure 1:
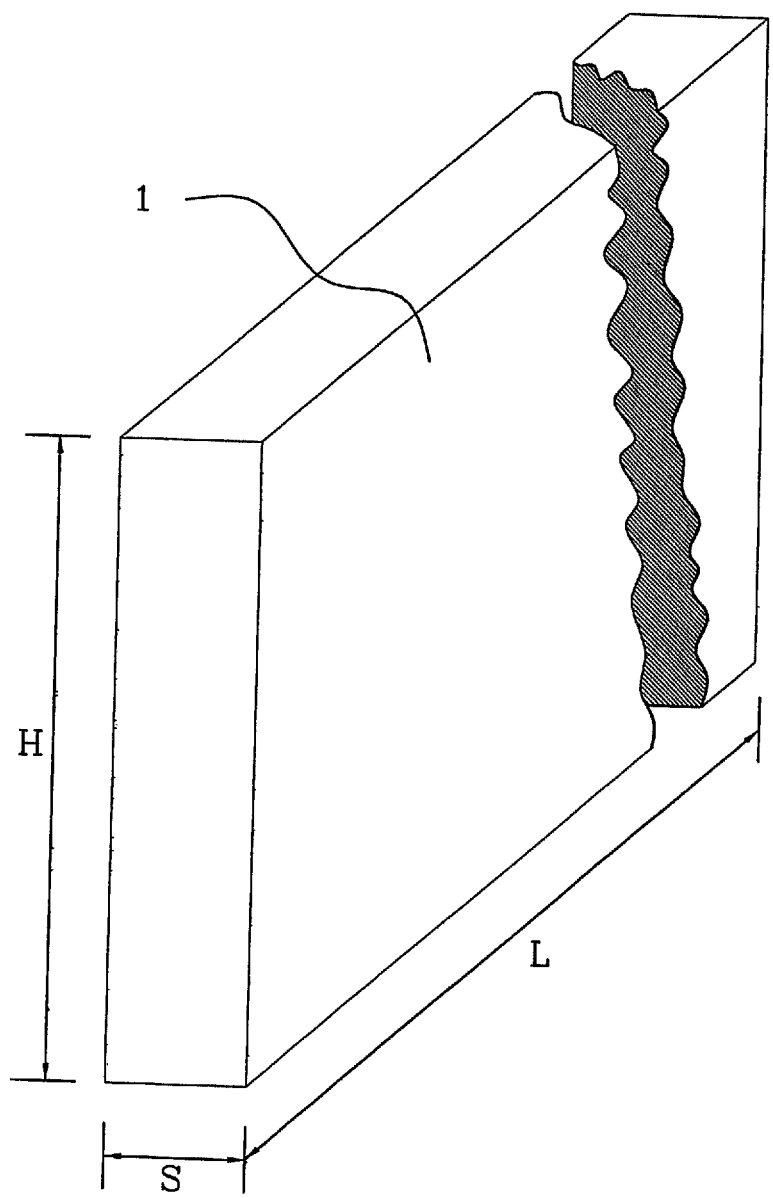
FIG. 1 shows a perspective view of the acetate plate from which the part of the eyeglass frame is formed according to the method of the invention.
Figure 2:
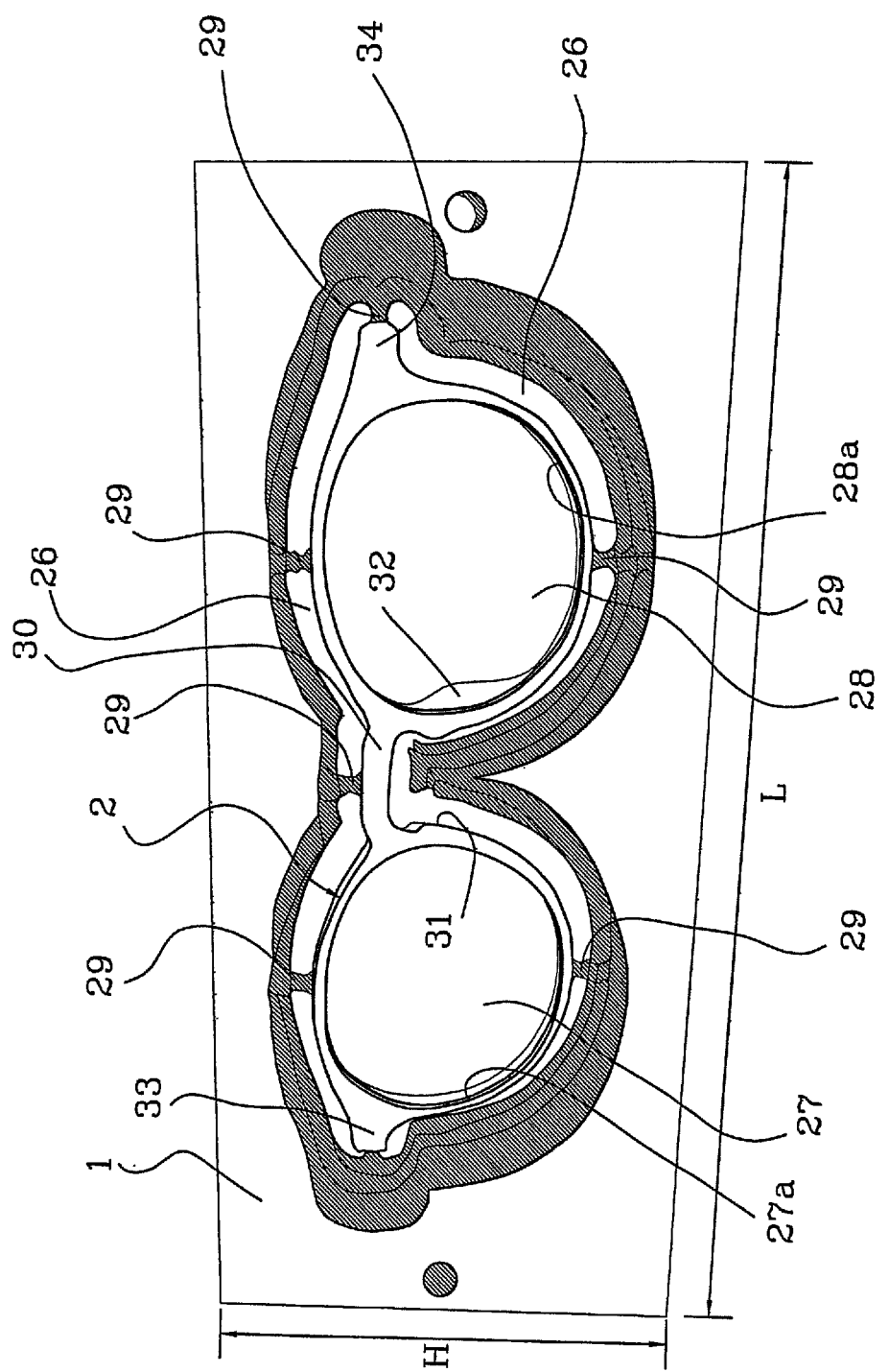
FIG. 2 shows a partially perspective view of one side of a frame part, particularly the front, partially formed from the acetate plate according to the method of the invention.
Figure 3:
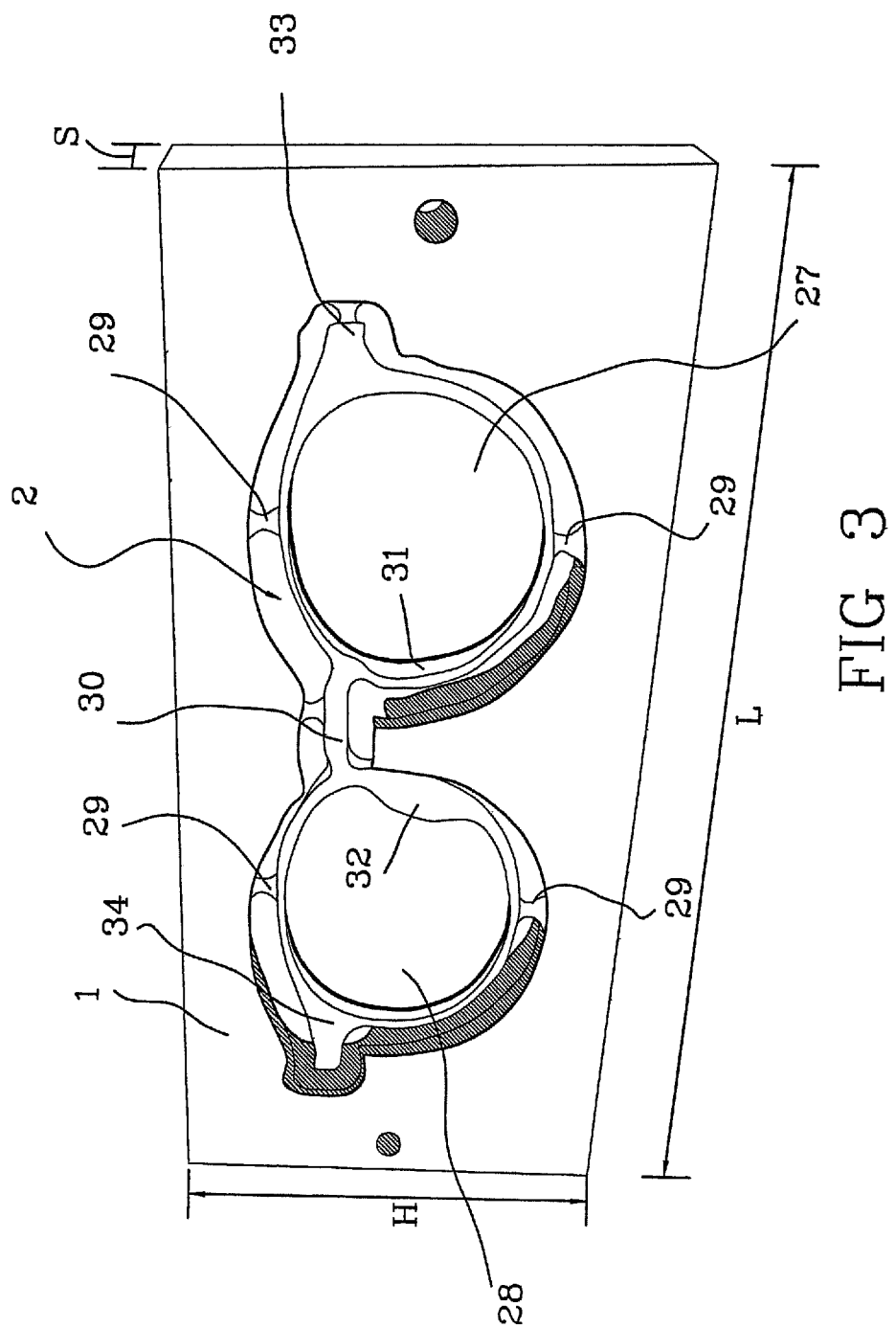
FIG. 3 shows a partially perspective view of one side, opposite to the side of FIG. 2, of a frame part, particularly the front, partially formed from the acetate plate according to the method of the invention.
Figure 4:
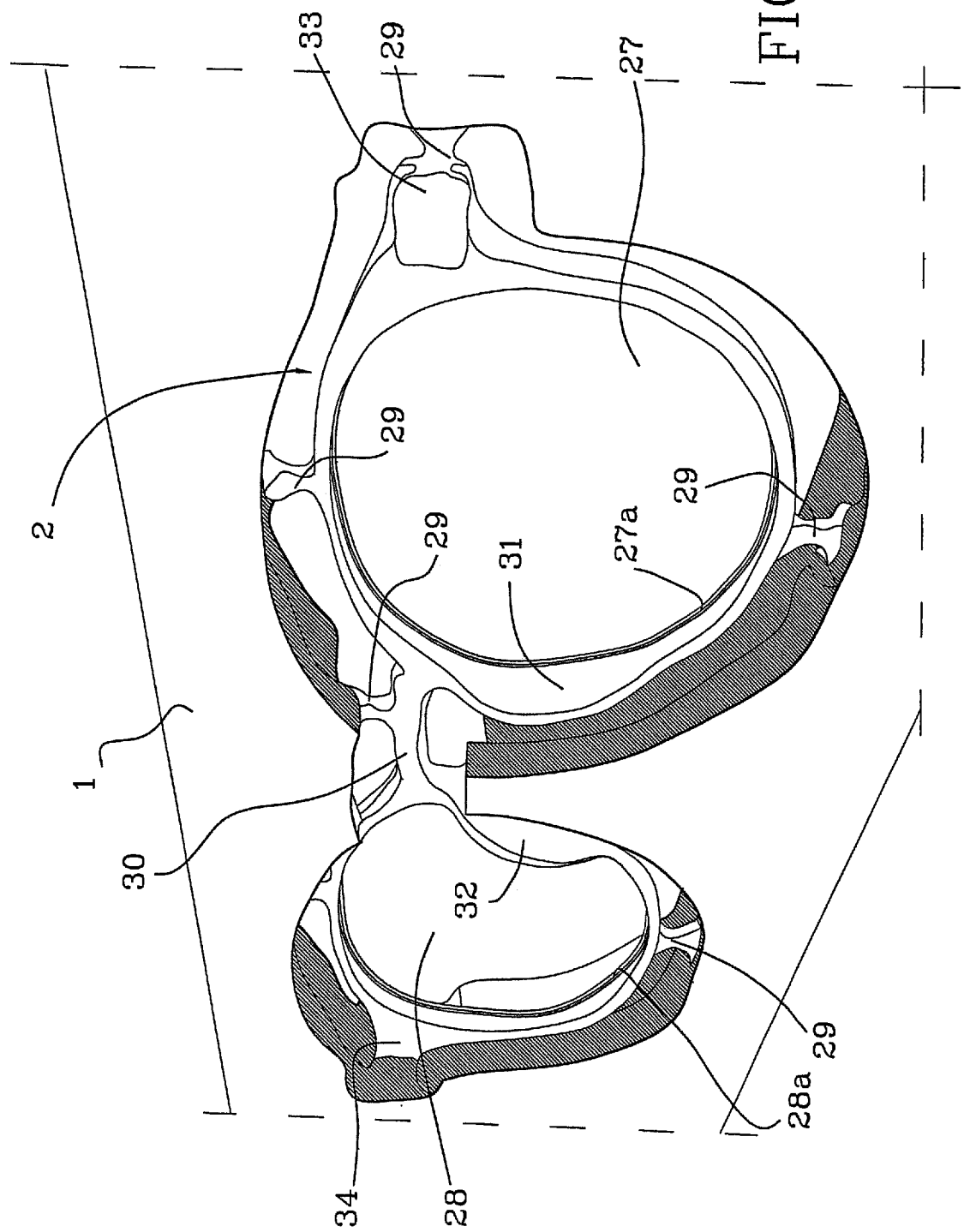
FIG. 4 shows an enlarged perspective view of FIG. 3.

Such length L and height H dimensions, according to the invention, define a surface area that encompasses the perimeter boundary of the body of the frame part to be formed, e.g. the front part with the lens seats, generally referenced 2 in FIGS. 2, 3 and 4, or the temples, not shown.

Preferably, the above mentioned area of the acetate plate 1 is larger than that defined by the boundary of the component to be manufactured.

Conversely, the thickness S is selected, according to the invention, to be at least equal to but preferably greater than the maximum transverse dimension of the three-dimensional shape of the frame part to be formed, also accounting for the conventional bent shape of the frame.

Particularly, the thickness of the plate, according to the invention, ranges from 10 to 15 mm and it extends evenly over the entire surface defined by the length L and the height H of the plate.

Figure 5:
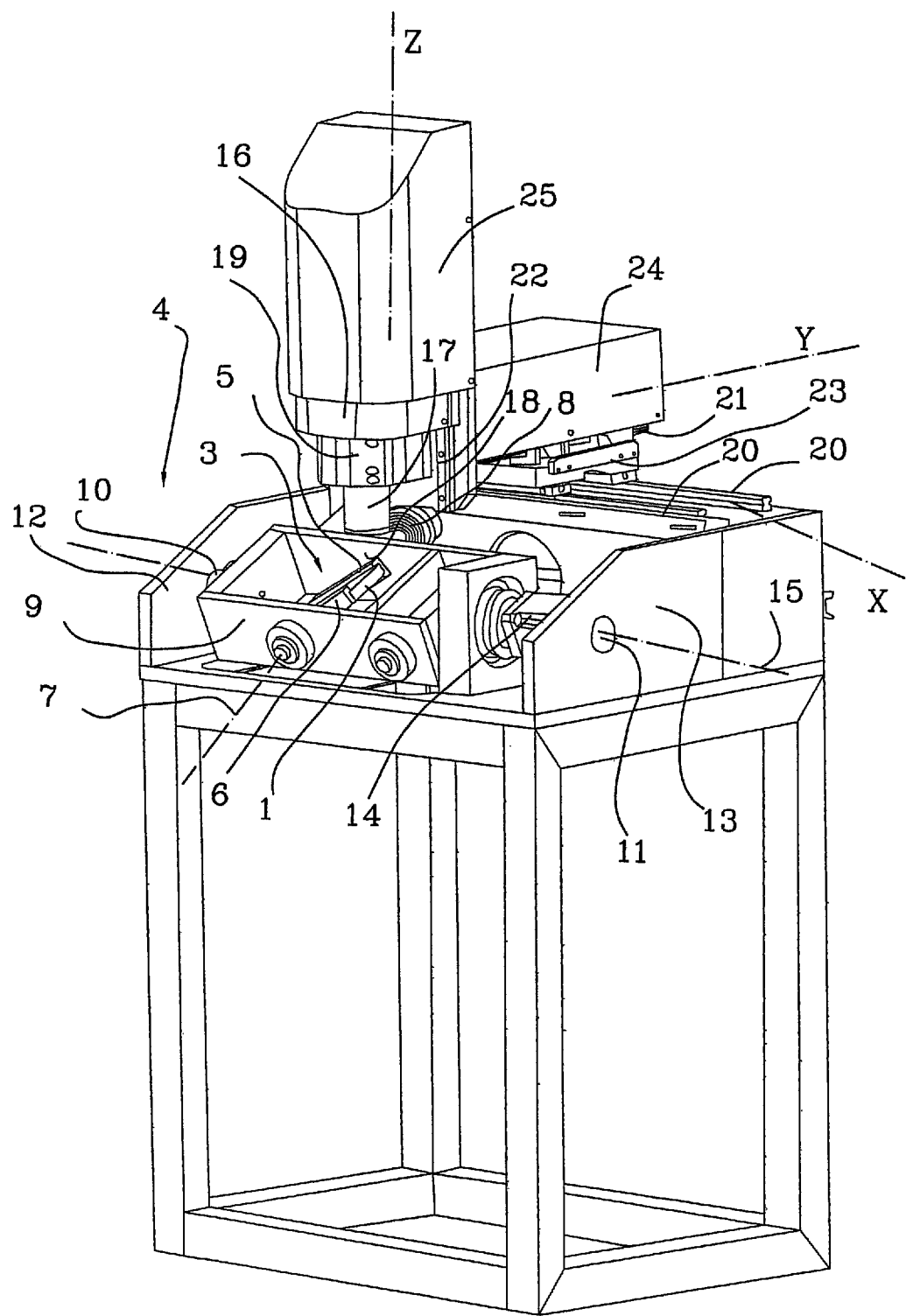
FIG. 5 shows a perspective front schematic view of an apparatus for carrying out the manufacturing method of the invention.
Figure 6:
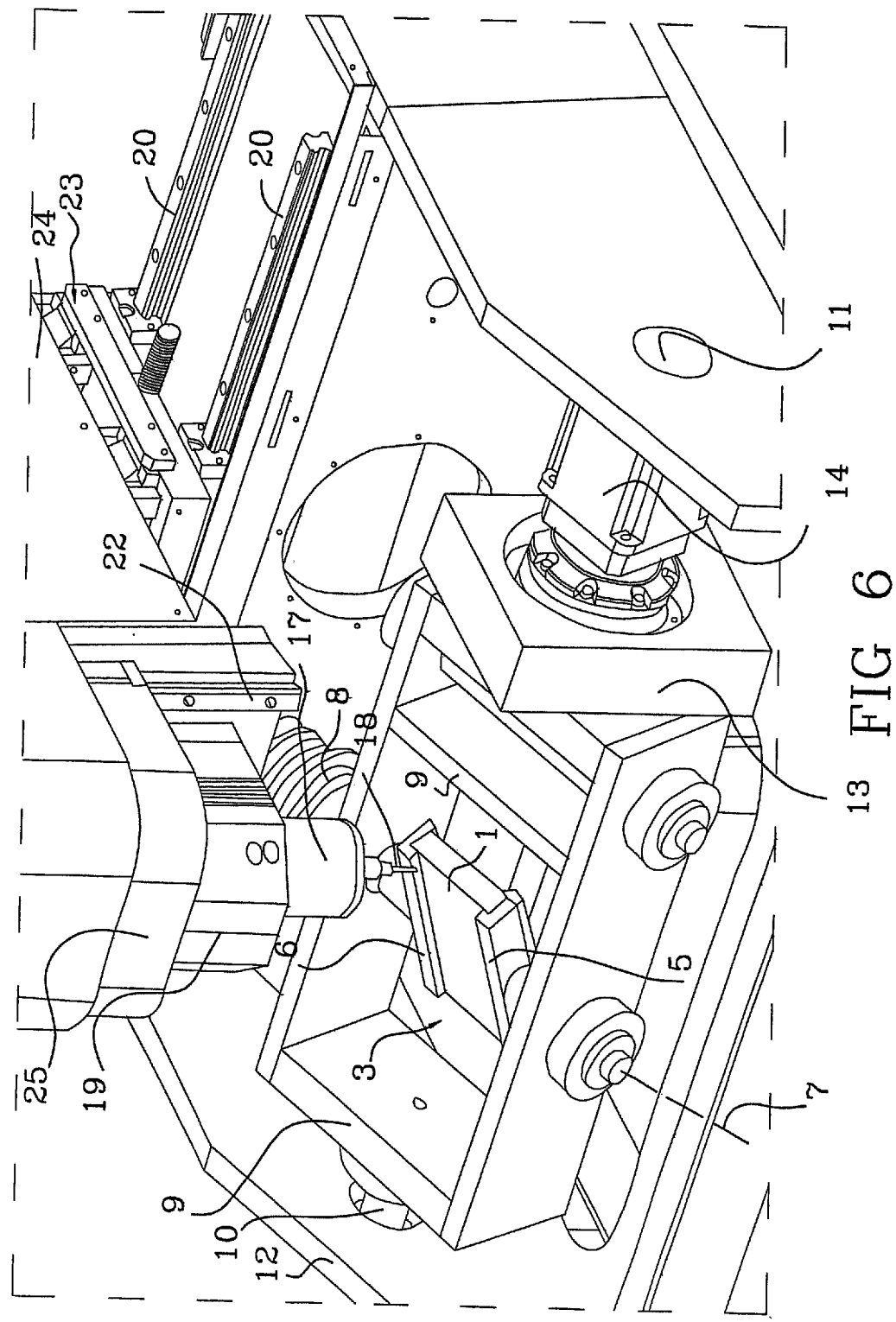
FIG. 6 shows an enlarged perspective view of a portion f the apparatus of FIG. 5.
Figure 7:
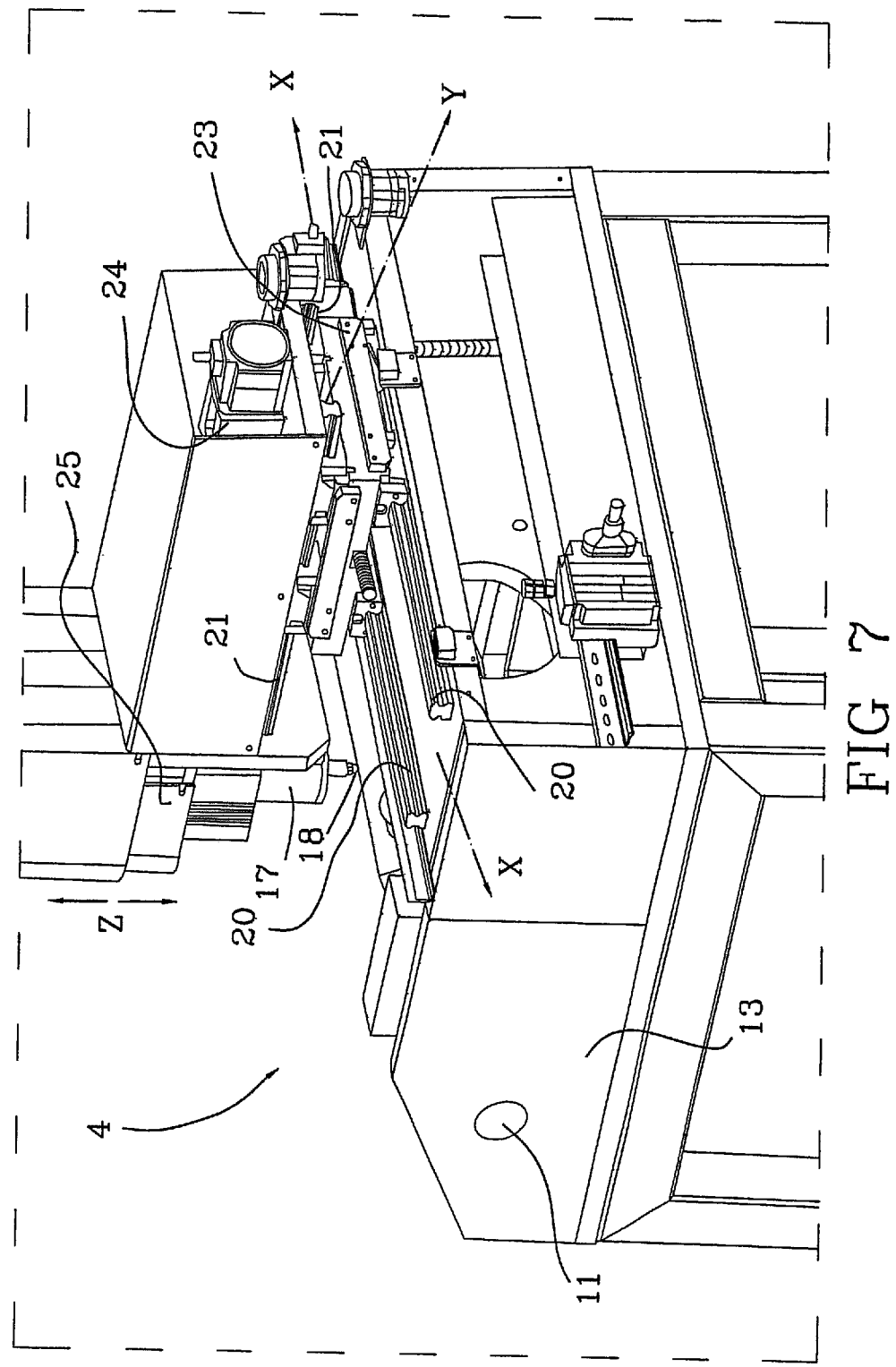
FIG. 7 shows a perspective rear schematic view of the apparatus of FIG. 5 from the side opposite to that of FIG. 5.

In order to carry out the process, according to the invention, the plate 1 is secured to a support, generally referenced 3, of a CNC milling machine, generally referenced 4 in FIGS. 5, 6 and 7.

The support 3 is composed of a pair of conventional clamps 5 and 6, between which the plate is stably clamped.

The support 3 is mounted to a first axis, referenced 7, about which it may be subjected to angular displacements, as imparted by a servo motor 8.

The axis 7 is mounted with its support 3 to a framework, referenced 9, which is mounted between the support shoulders 12 and 13 of the machine 4 by aligned pins 10 and 11. A servo motor 14 is mounted to the pin 11 and imparts angular displacements to the framework 9 about the axis 15 defined by the aligned pins 10 and 11.

The machine 4 also comprises a toolhead 16 with a mandrel 17 for actuation of the tool 18, such as a milling cutter, as shown in FIG. 6, or another type of rotary tool.

The mandrel 17 is actuated by a corresponding servo motor, referenced 19.

The head 16, with its mandrel 17 and servo motor 19 may move along three conventional Cartesian axes X, Y and Z which are shown, in FIG. 6 by the pair of horizontal guides 20 parallel to the axis 15, the pair of horizontal guides 21 perpendicular of the guides 20 and the pair of vertical guides 22.

The displacements along such Cartesian axes X, Y and Z are also controlled by conventional servo motors, which are accommodated on the slides referenced 23, 24 and 25 in FIG. 5 and in FIG. 7.

Referring to the manufacture of the front part of a frame, as shown in FIGS. 2, 3 and 4, the process of the invention comprises forming a cut 26 in the plate 1, using the tool 18, along the perimeter boundary of the part 2, and removing the material at the lens seats 27 and 28.

The cut 26 is not formed continuously, but leaves some portions of the boundary connected to the plate 1 by material bridges 29.

Then, possibly upon replacement of the tool 18 with an appropriate new one, the three-dimensional body of the frame 2 is formed within the thickness S of the plate 1 with a nose bridge 30 that already has its typical curved stape, bridge arms 31 and 32 for the frame to rest on the nose, and endpieces 33 and 34 for attachment to the temples, the latter not being shown.

The process of the invention also comprises the step of forming lens receiving grooves 27a and 28a in the seats 27 and 28 along their respective boundaries.

Once the roughed part has been prepared, the material bridges 29 are removed and the blank is separated from the plate 1.

Conventional finishing steps are now carried out.

It will be appreciated from the above disclosure that the steps of the inventive process are carried out using a numerical-control apparatus, by imparting the necessary movements to the toolhead 16, the support 3 with the plate 1 secured thereto and the framework 9, by means of corresponding servo motors.

The above mentioned movements are actuated and controlled by a conventional computer program, which may be designed for each model of the part to be manufactured. Therefore, the latter may be customized according to the peculiar geometric characteristics of the user's face.

Figure 8:
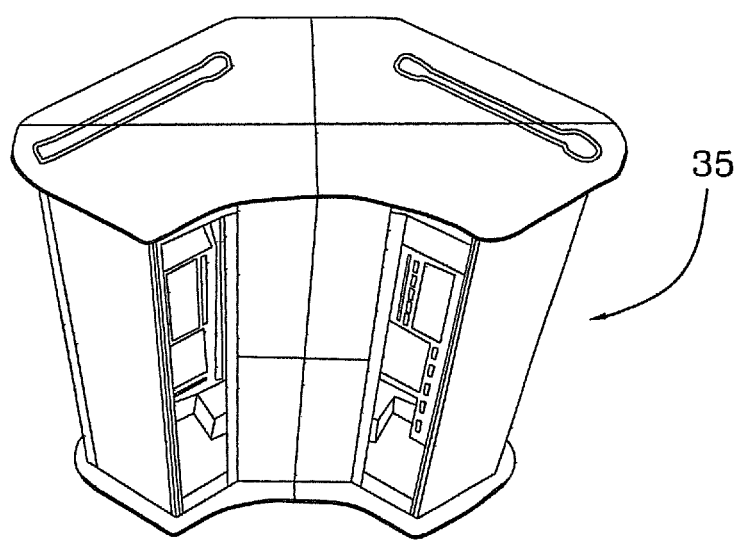
FIG. 8 shows a perspective schematic view of a 3D laser scanning device for control of the apparatus of the previous figures.

The apparatus of the invention comprises a 3D laser scanning device, generally referenced 35 in FIG. 8, which is known per se, and allows digitization of the surface of the face of the person for which the frame is designed.

This will allow detection of a user's profile, whereupon the computer program for controlling the apparatus will be retrieved, for the frame part to be manufactured in a directly user-customized manner.

The process of the invention has been disclosed herein with reference to the front part of an eyeglass frame.

Nevertheless, it shall be deemed to be also applied and applicable to the frame temples, with the obvious adaptations associated with their three-dimensional shape, which is different from that of the front.

The dimensions may be changed as needed, without departure from the scope of the invention as disclosed above and claimed below.

The invention claimed is:

1. A method of manufacturing a part of an acetate eyeglass frame from an acetate plate having a length, a height and a thickness, the method comprising:
   removing material from the acetate plate to form the part, wherein the part comprises a body having a perimeter boundary and a three-dimensional shape, the length and height of the plate define a surface area that encompasses the perimeter boundary of the body of the frame part to be manufactured, the thickness of the plate is at least equal to a maximum transverse dimension of the three-dimensional shape of the body of the frame part and extends evenly over the entire surface defined by the length and the height of the plate, and the frame part is a front part of the frame; and
   providing lens seats having grooves for receiving lenses, a nose bridge, bridge arms, and end pieces structured and arranged for connection to side temples on the frame part.

2. The method of claim 1, further comprising: forming a cut within the surface of the plate along the perimeter boundary of the body of the eyeglass part to be manufactured, leaving a pair of portions of said boundary, thereby leaving said portions connected to the plate; and forming the three-dimensional shape of the frame part body by removing the material from the thickness of the plate.

3. The method of claim 2, further comprising removing the portions of the boundary of the part that are still connected to the plate, thereby causing separation of the part from the plate.

4. The method of claim 1, further comprising surface finishing-the frame.

* * * * *